United States Patent
Kohli (10) Patent No.: US 10,880,302 B2
(45) Date of Patent: *Dec. 29, 2020

(54) SYSTEMS AND METHODS FOR BIOMETRIC AUTHENTICATION OF CERTIFICATE SIGNING REQUEST PROCESSING

(71) Applicant: MASTERCARD INTERNATIONAL INCORPORATED, Purchase, NY (US)

(72) Inventor: Manoneet Kohli, White Plains, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/584,540

(22) Filed: Sep. 26, 2019

(65) Prior Publication Data

US 2020/0028845 A1    Jan. 23, 2020

Related U.S. Application Data

(63) Continuation of application No. 15/484,297, filed on Apr. 11, 2017, now Pat. No. 10,484,373.

(51) Int. Cl.
*H04L 29/06* (2006.01)
*G06F 21/40* (2013.01)
(Continued)

(52) U.S. Cl.
CPC .......... *H04L 63/0861* (2013.01); *G06F 21/32* (2013.01); *G06F 21/33* (2013.01); *G06F 21/40* (2013.01); *H04L 63/0823* (2013.01)

(58) Field of Classification Search
CPC . H04L 63/0861; H04L 63/0823; G06F 21/40; G06F 21/33; G06F 21/32
See application file for complete search history.

(56) References Cited

U.S. PATENT DOCUMENTS 6,256,737 B1    7/2001    Bianco et al.
7,254,711 B2    8/2007    Shigematsu et al.
(Continued)

FOREIGN PATENT DOCUMENTS

WO    2016027111 A1    2/2016

OTHER PUBLICATIONS

PCT International Search Report and Written Opinion, Application No. PCT/US2018/025010, dated Jun. 4, 2018, 14 pps.

*Primary Examiner* — Huan V Doan
(74) *Attorney, Agent, or Firm* — Armstrong Teasdale LLP (57) ABSTRACT

A biometric certification request authentication (BCRA) computing device is provided for authenticating a requestor undergoing a certificate signing request process. The BCRA computing device is communicatively coupled to a memory device. The BCRA computing device is configured to receive, from a requestor computing device, a service selection request message that identifies a certificate service type for which the requestor requires a certificate, identify a certificate authority computing device that corresponds to a certificate authority that generates certificates of the certificate service type, transmit, to the requestor computing device, a first biometric sample request message that prompts the requestor to provide a first biometric sample, authenticate the first biometric sample received from the requestor computing device by determining a match between the first biometric sample and a stored biometric sample for the requestor, and based on the authentication, initiate providing the certificate file to the requestor computing device.

17 Claims, 5 Drawing Sheets

(51) Int. Cl.
    *G06F 21/33*   (2013.01)
    *G06F 21/32*   (2013.01)

(56) References Cited

U.S. PATENT DOCUMENTS

| | | |
|---|---|---|
| 8,370,262 B2 | 2/2013 | Blessing |
| 8,732,461 B2 | 5/2014 | Fujii et al. |
| 8,966,260 B1 | 2/2015 | Walter |
| 2003/0115456 A1 | 6/2003 | Kapoor |
| 2004/0064334 A1 | 4/2004 | Nye |
| 2007/0245414 A1 | 10/2007 | Chan et al. |
| 2008/0065895 A1 | 3/2008 | Liu et al. |
| 2011/0213965 A1* | 9/2011 | Fu .................. H04L 9/3213 713/158 |
| 2011/0296440 A1 | 12/2011 | Laurich et al. |
| 2013/0254535 A1 | 9/2013 | Akehurst et al. |
| 2015/0140964 A1* | 5/2015 | Horton ............ H04L 63/0861 455/410 |
| 2015/0200935 A1 | 7/2015 | Ikeda et al. |
| 2015/0264050 A1 | 9/2015 | Neuman et al. |
| 2017/0055146 A1 | 2/2017 | Ko |
| 2018/0183586 A1 | 6/2018 | Bhargav-Spantzel et al. |

\* cited by examiner

SYSTEMS AND METHODS FOR BIOMETRIC AUTHENTICATION OF CERTIFICATE SIGNING REQUEST PROCESSING

CROSS REFERENCE TO RELATED APPLICATIONS

This application is a continuation of U.S. patent application Ser. No. 15/484,297 filed on Apr. 11, 2017, entitled "SYSTEMS AND METHODS FOR BIOMETRIC AUTHENTICATION OF CERTIFICATE SIGNING REQUEST PROCESSING", which is hereby incorporated by reference in its entirety.

BACKGROUND

This disclosure relates to improving authentication functionality as it relates to digital certificate signing requests and approvals, and more specifically to methods and systems for biometric authentication of individuals requesting and approving digital certificates.

A digital certificate is an electronic document that is issued by a certificate authority (CA) and used to prove a person's identity during an electronic interaction. For example, a programmer depositing updated code in a central code repository will often require a digital certificate to "sign" the deposit, thereby proving that the programmer and not some other user was responsible for the deposit. Digital certificates may be limited to specific number of uses or a specific timeframe in which they can be used. Accordingly, regular users of digital certificates frequently need fresh digital certificates, which they request using a certificate signing request (CSR). A CSR is a specially formatted request sent to the CA that results in the CA issuing the required digital certificate.

While digital certificates are themselves considered a measure of security and authenticity, the process of requesting digital certificates is prone to certain limitations. Some known CSR systems are limited in their ability to positively identify that the requestor is an authorized user. For example, where a CA is entirely automated, anyone with access and familiarity to the CA's CSR process can "game" the system by presenting fake credentials in order to acquire a valid digital certificate. Even CA's whose process includes human intervention before they issue the digital certificate are vulnerable to social engineering attacks that can cause security risks. In some cases, otherwise-authorized users can also exploit these vulnerabilities, such as where an authorized user acquires the credentials of another authorized user and uses those credentials to cause the CA to issue a digital certificate. Similarly, an unauthorized user can carry out schemes such as "phishing" or "man-in-the-middle" attacks to acquire data such as usernames and passwords used to request the digital certificate, and subsequently request the certificate while masquerading as the authorized user. Attacks such as "packet-sniffing" or other network intrusions can be used to intercept and log network traffic across computing devices and result in unauthorized users acquiring digital certificates.

BRIEF DESCRIPTION

In one aspect, a biometric certification request authentication (BCRA) computing device is provided for authenticating a requestor undergoing a certificate signing request process. The BCRA computing device is communicatively coupled to a memory device. The BCRA computing device is configured to receive, from a requestor computing device, a service selection request message that identifies a certificate service type for which the requestor requires a certificate, identify a certificate authority computing device that corresponds to a certificate authority that generates certificates of the certificate service type, transmit, to the requestor computing device, a first biometric sample request message that prompts the requestor to provide a first biometric sample, authenticate the first biometric sample received from the requestor computing device by determining a match between the first biometric sample and a stored biometric sample for the requestor, and based on the authentication, initiate providing the certificate file to the requestor computing device.

In another aspect, a method of authenticating a requestor undergoing a certificate signing request process. The method is implemented using a biometric certification request authentication (BCRA) computing device coupled to a memory device. The method includes receiving, from a requestor computing device, a service selection request message that identifies a certificate service type for which the requestor requires a certificate, identifying a certificate authority computing device that corresponds to a certificate authority that generates certificates of the certificate service type, transmitting, to the requestor computing device, a first biometric sample request message that prompts the requestor to provide a first biometric sample, authenticating the first biometric sample received from the requestor computing device by determining a match between the first biometric sample and a stored biometric sample for the requestor, and based on the authentication, initiating providing the certificate file to the requestor computing device.

In yet another aspect, a non-transitory computer readable medium that includes computer executable instructions for authenticating a requestor undergoing a certificate signing request process is provided. When executed by a biometric certification request authentication (BCRA) computing device coupled to a memory device, the computer executable instructions cause the BCRA computing device to receive, from a requestor computing device, a service selection request message that identifies a certificate service type for which the requestor requires a certificate, identify a certificate authority computing device that corresponds to a certificate authority that generates certificates of the certificate service type, transmit, to the requestor computing device, a first biometric sample request message that prompts the requestor to provide a first biometric sample, authenticate the first biometric sample received from the requestor computing device by determining a match between the first biometric sample and a stored biometric sample for the requestor, and based on the authentication, initiate providing the certificate file to the requestor computing device.

BRIEF DESCRIPTION OF THE DRAWINGS

FIGS. 1-5 show example embodiments of the methods and systems described herein.

Like numbers in the Figures indicate the same or functionally similar components.

DETAILED DESCRIPTION

The systems and methods described herein relate generally to protecting electronic data using a biometric certificate request authentication (BCRA) computing device. More specifically, the systems and methods described herein enable a requestor of a digital certificate to be authenticated using biometric methods by a trusted party.

An overview of example embodiments is as follows. The requestor requires a certificate (also referred to herein as a digital certificate) to verify the requestor's identity during an electronic interaction with another party. The nature of the electronic interaction is also referred to herein as the "service" for which the requestor needs the certificate. The certificate will be generated by a certificate authority (CA) in response to a certificate signing request. A CA is a trusted third party that is relied upon both by the requestor and the other party that seeks to validate the requestor's identity. One CA may be configured to issue one or more types of certificates. Since the certificate is itself an authentication measure, a certificate signing request process must also be secured to prevent certificate signing request approvals for unauthorized users. Accordingly, the BCRA computing device communicates with a requestor computing device operated by a requestor. The requestor requests a certificate from the CA via the BCRA computing device. The requestor transmits, to the BCRA computing device, a service selection request message that includes an identifier of the type of service for which the requestor needs a certificate. The BCRA computing device uses biometric authentication to authenticate the requestor and then generates the certificate signing request that the BCRA computing device then transmits to a CA. When the CA generates the certificate, the BCRA computing device provides this certificate to the requestor.

A detailed description of example embodiments is now provided. In one example embodiment, the requestor will register with the BCRA computing device in a registration process. As part of the registration process, the requestor provides one or more requestor identifiers to the BCRA computing device. These requestor identifiers may be independently verifiable by the BCRA computing device or accepted as valid identifiers by the party associated with the BCRA computing device. For example, the requestor may register with the BCRA computing device during an employee onboarding process during which the requestor provides personally identifiable information such as a government-issued identifier. In addition, the requestor may provide a reference biometric sample for the BCRA computing device to store. The BCRA computing device stores this reference biometric sample in association with the other requestor identifiers. The BCRA computing device will later compare candidate biometric samples against this reference biometric sample in order to authenticate the requestor. In a related embodiment, the BCRA computing device transmits the reference biometric sample to a third party biometric authentication service that performs the comparison and submits authentication confirmation to the BCRA computing device. As part of the registration process, the requestor will also provide to the BCRA computing device a listing of one or more services for which the requestor is likely to need digital certificates. For example, the requestor may need a certificate for signing a code deposit in a repository, or for digitally signing electronic messages, or the like. Additionally, the requestor may be able to later edit the service listing to add or remove services for which certificates are required.

As part of the registration process, the BCRA computing device also provides the requestor with access to an electronic means of communicating data related to the requestor's certificate signing request process. For example, the BCRA computing device may invite the requestor to download and activate a computer application on the requestor's computing device. As another example, the BCRA computing device will provide the requestor with a web site or web page that provides the abovementioned functionality. The requestor is given access to a dashboard, portal, or similar electronic interface where the requestor can enter service selection requests, provide biometric samples, receive certificate files, send and receive informational messages (e.g., messages from the BCRA computing device stating whether the authentication succeeded or failed), or the like.

The BCRA computing device is configured to perform a variety of functions that relate to a requestor's certificate signing request process. In one embodiment, the BCRA computing device is also a certificate authority so that the BCRA computing device issues its own digital certificates once biometric authentication of the requestor is complete. In another embodiment, the BCRA computing device also performs the biometric authentication itself. For example, the BCRA computing device is configured to perform several biometric authentication processes, including facial recognition, fingerprint recognition, voice recognition, retinal scan recognition, iris scan recognition, eye movement recognition, handwritten signature recognition, finger vein pattern recognition, or the like.

In the example embodiment, the requestor transmits a service selection request message that identifies a certificate service type for which the requestor requires a certificate. The certificate service type may be, for example, "Code Signing Service Certificate" for a requestor that needs a certificate to digitally sign a code deposit before depositing it in a code repository. The requestor will preferably be able to select the required service from a list of services provided during registration and/or from a predefined list provided by the BCRA computing device via the computer application or website being used by the requestor.

The BCRA computing device is configured to receive the service selection request message and extract the certificate service type. The BCRA computing device uses the certificate service type to identify a certificate authority (CA) computing device. The CA computing device is associated with a certificate authority that generates certificates of the certificate service type. The BCRA computing device is further configured to transmit, to the requestor computing device, a first biometric sample request message. The first biometric sample request message prompts the requestor to provide a first biometric sample.

In the example embodiment, the requestor provides a first biometric sample to the BCRA computing device. For example, the requestor uses a computer application installed on the requestor computing device to provide the first biometric sample. Receipt of the first biometric sample request message causes activation of the computer application. The computer application in turn causes activation of controls on the requestor computing device to facilitate provision of the first biometric sample. For example, the requestor may have provided a fingerprint as a reference biometric sample during registration. Accordingly, where a candidate fingerprint is desired as the first biometric sample, the first biometric sample request message may display on the display interface with a pointer to a box labeled "Provide thumb impression here". As another example, the first biometric sample request message may cause a camera device on the requestor computing device to activate and display an additional message stating, for example "Provide retinal scan" or "Take a photo of your face in order to provide your biometric sample". As yet another example, the first biometric sample request message may activate a microphone or sound recording feature on the requestor computing device and display a message on the display interface stating "Say your name (or some other predefined words) in order to provide your biometric sample." The requestor provides the biometric sample which is converted to electronic data by the computer application for transmission to the BCRA computing device.

The computer application causes the requestor computing device to transmit the first biometric sample (as an electronic data message) to the BCRA computing device. The BCRA computing device is configured to authenticate the first biometric sample received from the requestor computing device by determining a match between the first biometric sample and the reference biometric sample that was stored for the requestor. For example, the BCRA computing device compares the candidate fingerprint to a reference fingerprint. More specifically, the BCRA computing device may apply image processing techniques to compare the two fingerprints. As another example, the BCRA computing device computes a mathematical value generated from each of the fingerprints using an algorithm and compares the two mathematical values. If a match is found, the BCRA computing device is configured to proceed to certificate signing request generation and, optionally, to send confirmation to the requestor computing device.

As mentioned, the BCRA computing device may also transmit the first biometric sample and the reference biometric sample to a third party biometric authentication service. This third party biometric authentication service may be available in the same organization as the BCRA computing device or it may be an external service. In either or both of these cases, the BCRA computing device may make a web service call or other electronic communication to the third party biometric authentication service.

Based on a successful authentication of the requestor's biometric sample, the BCRA computing device is configured to generate a certificate signing request (CSR). A CSR is an electronic request message that is configured to cause a CA to generate a digital certificate. Accordingly, a CSR is preferably in a format understood by a particular CA. As noted above, the BCRA computing device identifies the CA that can generate the certificate needed for the requestor's desired service. The BCRA computing device also identifies the format that the relevant CA understands for CSR's. Accordingly, the BCRA computing device generates a CSR that is in a format that corresponds to the certificate authority. The BCRA computing device transmits the CSR to the CA computing device. The CA computing device receives the CSR and generates a certificate file including a digital certificate that corresponds to the certificate service type. The BCRA computing device receives this certificate file from the CA computing device.

The BCRA computing device is configured to prepare the received certificate file for transmission to the requestor computing device. In one example, the BCRA computing device generates a universal resource locator (URL) that points to a web page or other web endpoint where the BCRA computing device stores the certificate file. As another example, the BCRA computing device sends a message (e.g., an email) to the requestor notifying the requestor that the requested certificate is ready to be accessed at the URL or other electronic location. As yet another example, the BCRA computing device may transmit the certificate file to the computer application installed on the requestor computing device. The requestor can then access the certificate file using the computer application. The requestor downloads or otherwise accesses the requested certificate file and uses it for the certificate service type that was originally provided.

In another example embodiment, the BCRA computing device does not generate the CSR. In contrast, the BCRA computing device completes the biometric authentication and then transmits a communication to the computer application on the requestor computing device. The computer application, in this example, is configured to generate its own CSR's that it then transmits to the relevant certificate authority.

In another example embodiment, the CA requires more than just the requestor to be authenticated. The CA may require a specific chain, sequence, or set of approvals before issuing a certificate. In this example, the CA specifies its required approvals in an approval policy that the CA provides to the BCRA computing device. The BCRA computing device is configured to store approval policies from each connected CA and check the relevant approval policy before generating a CSR. For example, a CA may require biometric authentication for both the requestor and the requestor's supervisor. Determining from the CA's approval policy that two approvals are required, the BCRA computing device first transmits the first biometric sample request message to the requestor as described above. Upon receiving a biometric sample and validating it, the BCRA computing device proceeds to send a second biometric sample request message to the requestor's supervisor. In this example, the requestor provides identifiers for the requestor's supervisor(s) during the abovementioned registration process. The supervisor sends a second biometric sample in response to the second biometric sample request message. The BCRA computing device is configured to authenticate the second biometric sample. The BCRA computing device is also configured to generate, in a memory device, an authentication chain data field and, in it, store authentication validation data for both the requestor and the supervisor. Furthermore, the BCRA computing device is configured to transmit this authentication chain data field as part of any CSR that is transmitted to the CA discussed in this example. The CA, on receiving the CSR, checks the authentication chain data field, determines that authentication has been performed for both the requestor and the supervisor, and issues the requested certificate.

The technical problems addressed by this system include at least one of: (i) limitations of systems that cannot authenticate a requestor's certificate service requests, (ii) inability to use existing biometric sample data to authenticate certificate service requests, and (iii) limitations of systems that may require additional entities (e.g., human resources) to authenticate the identity of a requestor each time the requestor needs a digital certificate.

The methods and systems described herein may be implemented using computer programming or engineering techniques including computer software, firmware, hardware, or any combination or subset thereof, wherein the technical effects may be achieved by a) receiving, from a requestor computing device, a service selection request message that identifies a certificate service type for which the requestor requires a certificate, b) identifying a certificate authority computing device that corresponds to a certificate authority that generates certificates of the certificate service type, c) transmitting, to the requestor computing device, a first biometric sample request message that prompts the requestor to provide a first biometric sample, d) authenticating the first biometric sample received from the requestor computing device by determining a match between the first biometric sample and a stored biometric sample for the requestor, and e) based on the authentication, initiating providing the certificate file to the requestor computing device.

The resulting technical benefits achieved by this system include at least one of: (i) improved system experiences because a requestor is not required to contact additional entities such as human resources in an offline process just to request a certificate, (ii) improved data security because requestors' biometric data is not propagated across different communication channels unnecessarily, (iii) improved data security because digital certificates are issued only to biometrically authenticated requestors, (iv) improved data security stemming from a chained authentication process whereby requestors and one or more others (e.g., supervisors) are authenticated before a digital certificate is issued, (v) reduced need for dedicated communication channels (between multiple requestors and multiple certificate authorities) that are otherwise required whenever a single requestor needs more than one type of certificate, and (vi) a centralized portal or dashboard (e.g., the computer application described above) that a requestor can use to request any type of certificate.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable storage medium. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computer devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application in industrial, commercial, and academic applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

Figure 1:
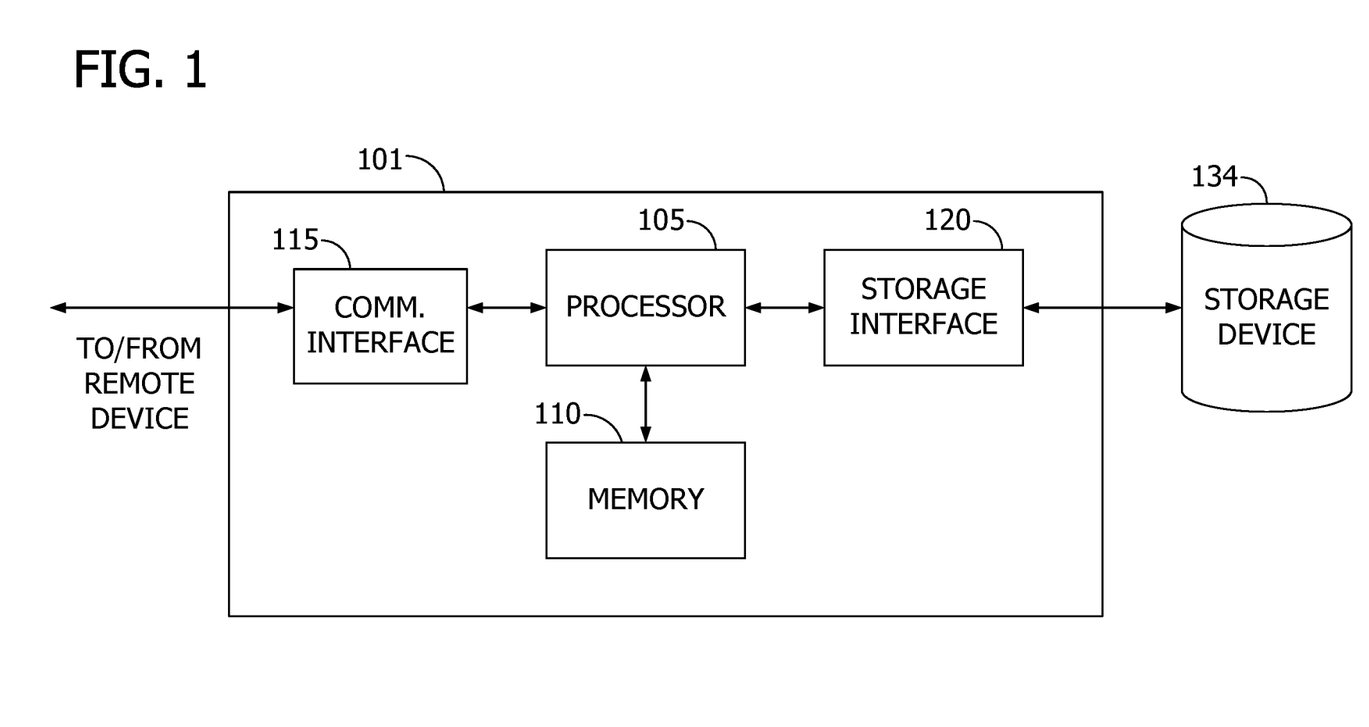
FIG. 1 illustrates an example configuration of a biometric certificate request authentication (BCRA) computing device that is configured to enable a requestor to biometrically authenticate during a certificate signing request process.

FIG. 1 illustrates an example configuration of a BCRA computing device 101 that is configured to enable a requestor to biometrically authenticate during a certificate signing request process. BCRA computing device 101 includes a processor 105 for executing instructions. Instructions may be stored in a memory area 110, for example. Processor 105 may include one or more processing units (e.g., in a multi-core configuration) for executing instructions. The instructions may be executed within a variety of different operating systems on BCRA computing device 101, such as UNIX, LINUX, Microsoft Windows®, etc. More specifically, the instructions may cause various data manipulations on data stored in storage device 134 (e.g., create, read, update, and delete procedures). It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.). Processor 105 is operatively coupled to a communication interface 115 such that BCRA computing device 101 is capable of communicating with a remote device such as a requestor computer device.

Processor 105 may also be operatively coupled to a storage device 134. Storage device 134 is any computer-operated hardware suitable for storing and/or retrieving data. In some embodiments, storage device 134 is integrated in BCRA computing device 101. In other embodiments, storage device 134 is external to BCRA computing device 101. For example, BCRA computing device 101 may include one or more hard disk drives as storage device 134. In other embodiments, storage device 134 is external to BCRA computing device 101. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 105 is operatively coupled to storage device 134 via a storage interface 120. Storage interface 120 is any component capable of providing processor 105 with access to storage device 134. Storage interface 120 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 105 with access to storage device 134.

Memory area 110 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 2:
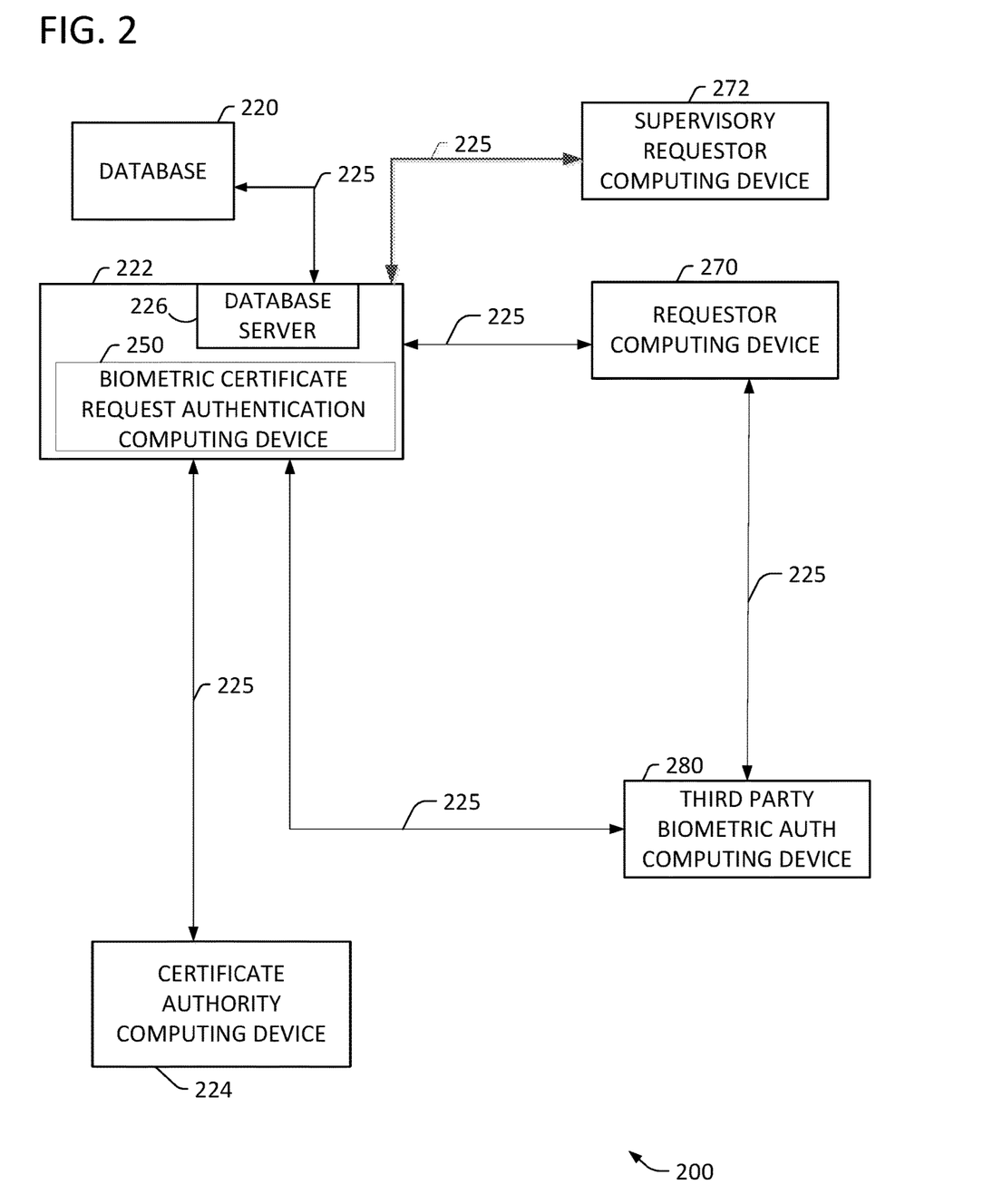
FIG. 2 is a block diagram of an example biometric certificate request authentication environment for enabling a requestor to biometrically authenticate a certificate signing request process.

FIG. 2 is a block diagram of an example biometric certificate request authentication environment for enabling a requestor to biometrically authenticate a certificate signing request process, in which a variety of computing devices are communicatively coupled to each other via a plurality of network connections. These network connections may be Internet, LAN/WAN, or other connections capable of transmitting data across computing devices. Environment 200 shows a BCRA computing device 250 communicatively coupled to a database server 226. In one embodiment, BCRA computing device 250 and database server 226 are components of a server system 222. Server system 222 may be a server, a network of multiple computer devices, a virtual computing device, or the like. BCRA computing device 250 is connected, via one or more network connections 225, to at least one requestor computing device 270 operated by a requestor, a supervisory requestor computing device 272 operated by a supervisor of the requestor, a third party biometric authentication computing device 280 configured to authenticate biometric samples, and a certificate authority computing device 224 that generates certificate files.

In one embodiment, BCRA computing device 250 is configured to receive request messages from requestor computing device 270, over a network connection 225. These request messages are, in one embodiment, service selection request messages that include an identifier for a type of service that the requestor needs to be performed with use of a certificate. BCRA computing device 250 processes these service selection request messages and transmits certificate files back to the requestor as described above and also in greater detail with respect to FIG. 3.

In one embodiment, BCRA computing device 250 is configured to authenticate biometric samples received from requestor computing device 270. In another embodiment, BCRA computing device 250 forwards biometric samples to third party biometric authentication computing device 280. Third party biometric authentication computing device 280 authenticates the biometric sample and transmits back an authentication confirmation message to BCRA computing device 250. Once authentication has been completed, BCRA computing device 250 transmits a certificate signing request (CSR) to certificate authority computing device 224, which returns a certificate file that BCRA computing device 250 can then provide to requestor computing device 270. In a related embodiment, BCRA computing device 250 may, after authenticating the requestor, transmit an additional prompt to supervisory requestor computing device 272 requesting a biometric sample from one or more supervisors of the requestor. Only when a sufficient number of biometric samples have been authenticated does BCRA computing device 250 then generate the CSR and send to certificate authority computing device 224.

Database server 226 is connected to database 220, which contains information on a variety of matters, as described below in greater detail. In one embodiment, database 220 is stored on server system 222 and can be accessed by potential users of server system 222. In an alternative embodiment, database 220 is stored remotely from server system 222 and may be non-centralized. Database 220 may include a single database having separated sections or partitions or may include multiple databases, each being separate from each other. Database 220 may store biometric authentication data for each requestor in communication with BCRA computing device 250.

In the example embodiment, BCRA computing device 150 does not consist of generic computer hardware, nor does it require merely generic computer instructions to perform the above functions. Rather, BCRA computing device 150 is a specially designed and customized computer device built to perform the specific function of biometrically authenticating a requestor during a certificate signing request process, processing inputs from the requestor, and generating outputs (e.g., links to certificate files) bearing data received from other computing devices (e.g., certificate authority computing devices).

Figure 3:
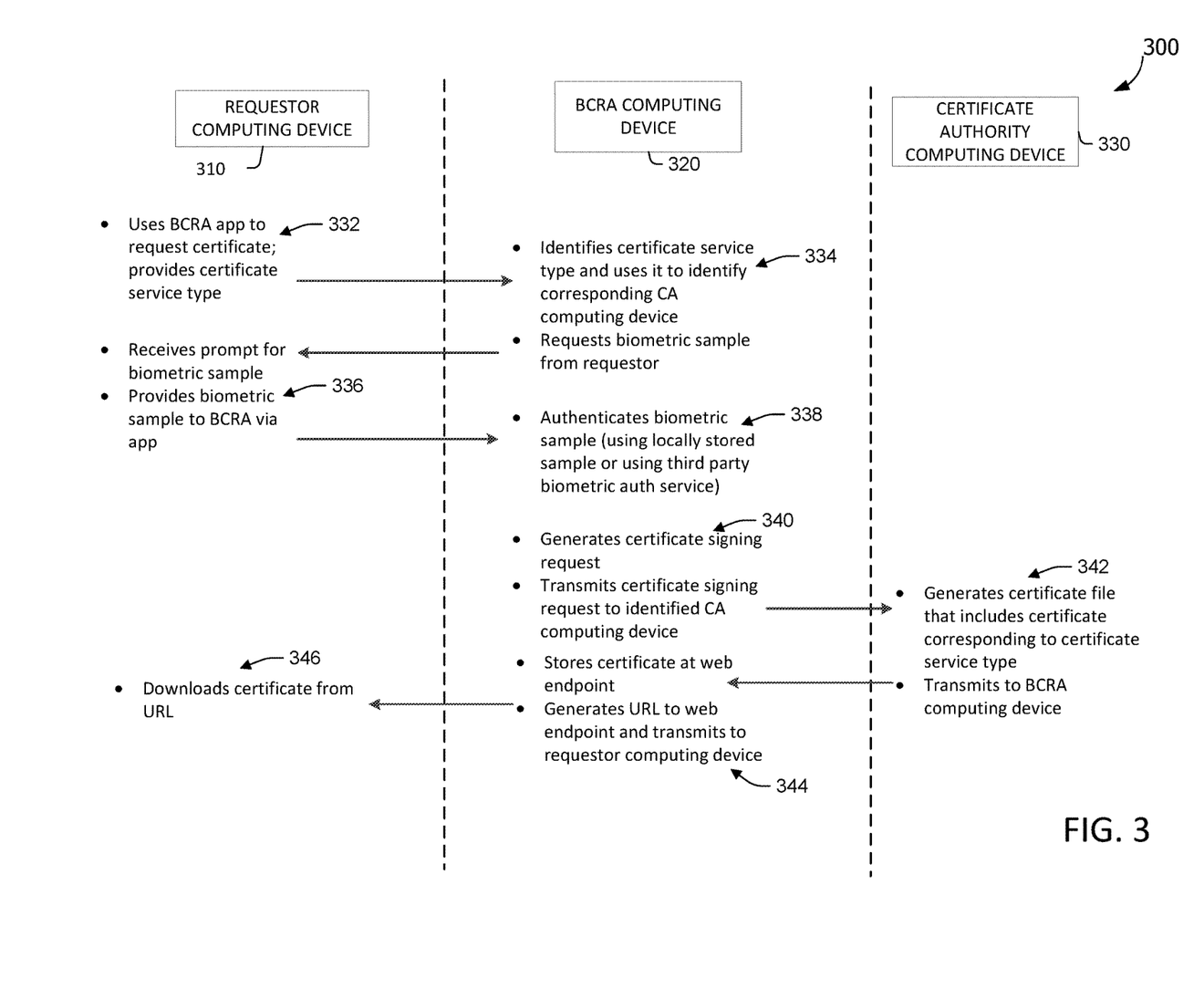
FIG. 3 shows an example message flow by which a BCRA computing device enables a requestor to biometrically authenticate during a certificate signing request process.

FIG. 3 shows an example message flow 300 by which a BCRA computing device 230 (similar to BCRA computing device 101 as described in FIG. 1) enables a requestor to biometrically authenticate during a certificate signing request process. Message flow 300 involves requestor computing device 310 (similar to requestor computing device 270 as shown in FIG. 2), BCRA computing device 320 (similar to BCRA computing device 250 as shown in FIG. 2), and certificate authority (CA) computing device 330 (similar to certificate authority computing device 224 as shown in FIG. 2). Message flow 300 begins at 332 when a requestor transmits a service selection request message to BCRA computing device 250. As described above, the service selection request message includes a service identifier which represents a service for which the requestor needs a digital certificate. For example, the requestor may need to digitally "sign" an entry of code into a code repository, thereby confirming that the requestor is the legitimate depositor of the code and not an unauthorized user. The service identifier in this example may be called "Code Signing Certificate." In another example, the requestor may need a digital certificate to digitally sign a communication to another computer user over a public network (e.g., for an email sent over the public Internet). The service identifier in this example may be called "Email Transmission Certificate."

BCRA computing device 250 receives 334 the service selection request message and extracts the service identifier. Using the service identifier, BCRA computing device 250 performs a lookup in a memory device (e.g., database 220 as described with respect to FIG. 2). The lookup is directed to isolating one or more certificate authorities that are associated, in the memory device, with the service identifier. For example, a certificate authority K will be identified as being qualified to issue digital certificates that are configured for digitally signing a code deposit. Accordingly, BCRA computing device 250 identifies certificate authority K and further identifies CA computing device 330 as being associated with certificate authority K.

Also at 334, BCRA computing device 250 transmits a first biometric sample request message to requestor computing device 310. The first biometric sample request message is configured to prompt requestor computing device 310 to display the request on a display interface in order to facilitate the requestor's ability to provide a biometric sample. For example, where a fingerprint is desired as the biometric sample, the first biometric sample request message may display on the display interface with a pointer to a box labeled "Provide thumb impression here". As another example, the first biometric sample request message may cause a camera device on requestor computing device 310 to activate and display an additional message stating, for example "Provide retinal scan" or "Take a photo of your face in order to provide your biometric sample". As yet another example, the first biometric sample request message may activate a microphone or sound recording feature on requestor computing device 310 and display a message on the display interface stating "Say your name (or some other predefined words) in order to provide your biometric sample."

At 336, requestor computing device 310 receives the first biometric sample request message. The requestor will provide the first biometric sample. Requestor computing device 310 sends the first biometric sample to BCRA computing device 250. At 338, BCRA computing device 250 receives the first biometric sample and authenticates it. In one embodiment, BCRA computing device 250 has access to one or more stored biometric samples for the requestor that are provided during a registration process as described earlier. The authentication process involves comparing the received first biometric sample to the one or more stored biometric samples. More specifically, BCRA computing device 250 retrieves the stored biometric sample that was previously provided during a registration process. During the registration process, a requestor identifier or requestor device identifier is also provided. Accordingly, BCRA computing device 250 associates the provided requestor identifier or requestor device identifier with the first biometric sample. During the authentication process, BCRA computing device 250 uses this association to retrieve the stored biometric sample associated with the requestor. In a related embodiment, BCRA computing device 250 compares the received first biometric sample to all stored biometric samples. If there is a match between the first biometric sample and the stored biometric sample(s), the requestor is considered to be an authentic requestor. If there is not a match, the authentication fails and the requestor is provided a message bearing information that the authentication has failed and may be retried. Alternatively, the requestor may be prompted to return to a registration process to provide a biometric sample for storage and comparison.

In a related embodiment, BCRA computing device 250 is configured to prompt one or more additional individuals to provide biometric authentication before a certificate signing request may be generated. More specifically, BCRA computing device 250 determines that certificate authority K (as described above) requires a specific number of authentication validations before certificate authority K will issue a digital certificate. Even more specifically, certificate authority K may encode this number of authentication validations and/or other regulations in an approval policy file that is provided to BCRA computing device 250. Accordingly, once BCRA computing device 250 identifies certificate authority K as being the relevant CA to be used, BCRA computing device 250 is configured to review the approval policy before proceeding. In one embodiment, BCRA computing device 250 determines that the approval policy requires authentication validation for 1) the requestor, and 2) the requestor's immediate supervisor. Accordingly, BCRA computing device 250 searches a memory device (e.g., database 220) for an identifier of the requestor's supervisor (or supervisor identifier). Using the supervisor identifier (e.g., email address), BCRA computing device 250 transmits a second biometric sample request message to the requestor's supervisor (as in, to the supervisor's computing device) requesting biometric authentication. In this embodiment, the supervisor provides a second biometric sample that BCRA computing device 250 then authenticates in a manner similar to that described above with respect to the requestor. In an alternate embodiment, BCRA computing device 250 may determine that the approval policy requires only that the supervisor audit or approve the requestor's request and that a supervisor's biometric authentication is not required. Accordingly, BCRA computing device 250 requests audit approval from the supervisor and does not request a biometric sample.

In the related embodiment described immediately above, BCRA computing device 250 is configured to generate electronic links between authentication validation data that is generated when the requestor is authenticated and authentication validation data that is generated when the supervisor is authenticated. For example, BCRA computing device 250 may generate an authentication chain data field in a memory device (e.g., database 220). The authentication chain data field may be generated according to a data structure that facilitates storage of linked data (e.g., an array, a linked list, a graph, or the like). The authentication chain data field is appended to the certificate signing request that is generated as described below.

Given that the first biometric sample is authenticated, at 340 BCRA computing device 250 generates a certificate signing request (CSR). In one embodiment, a CSR is configured to cause a certificate authority to generate a certificate file. The CSR is in a specific format that is usable by the certificate authority. Accordingly, BCRA computing device 250 reviews the certificate authority K that was identified at 334 and determines a specific format that is compatible with certificate authority K. In the example embodiment, the specific format is embodied by Public Key Cryptography Standard (PKCS) #10. Accordingly, BCRA computing device 250 generates the CSR in the PKCS #10 format and transmits it to CA computing device 330.

At 342, CA computing device 330 receives the CSR and generates a certificate file. As part of the generation process, CA computing device 330 may check the authentication chain data field that is attached to or associated with the CSR. If the authentication chain data field is found to include a sufficient number of authentication validations (i.e., a number that comports with certificate authority K's approval policy), CA computing device 330 generates a certificate file bearing a digital certificate. The digital certificate is configured to be usable for the service initially requested by the issuer at 332. CA computing device 330 transmits the certificate file to BCRA computing device 250.

BCRA computing device 250 receives the certificate file and stores 344 it at an electronic location that is accessible by the requestor. For example, the location may be a web endpoint. Accordingly, BCRA computing device 250 generates a universal resource locator (URL) that provides access to the certificate file stored at the web endpoint. BCRA computing device 250 transmits the URL to requestor computing device 310. The requestor uses requestor computing device 310 to download 346 the certificate file from the URL and proceeds to use the certificate for the service that was initially specified by the requestor.

Figure 4:
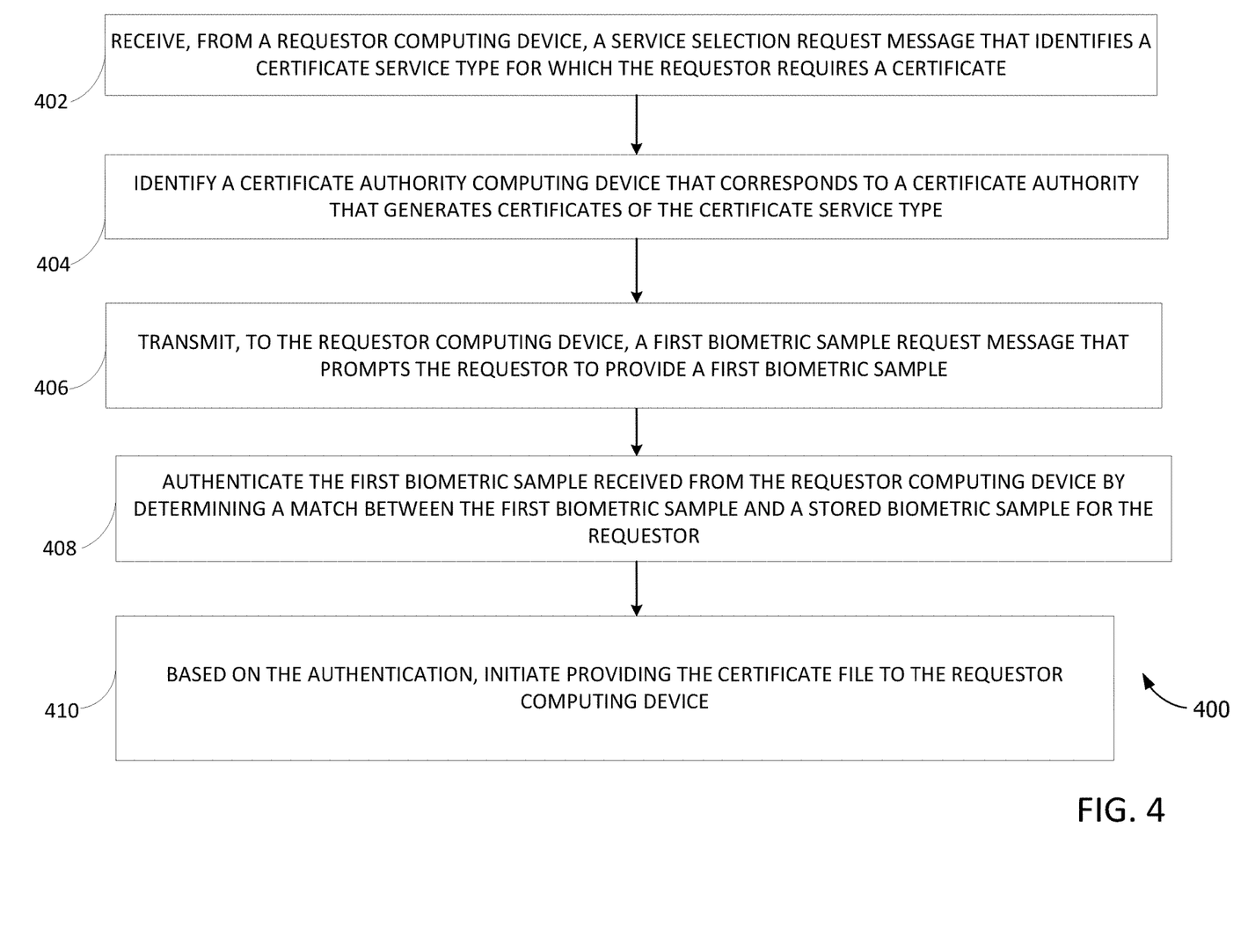
FIG. 4 shows an example method flow that illustrates how the BCRA computing device enables a requestor to biometrically authenticate during a certificate signing request process.

FIG. 4 shows an example method flow 400 that illustrates how the BCRA computing device enables a requestor to biometrically authenticate during a certificate signing request process. The BCRA computing device is connected to a memory device. The BCRA computing device is configured to receive 402, from a requestor computing device, a service selection request message. As described above with respect to FIG. 3, the service selection request message identifies a certificate service type for which the requestor requires a certificate.

The BCRA computing device is configured to identify 404 a certificate authority computing device that corresponds to a certificate authority that generates certificates of the certificate service type. For example, the certificate authority computing device will be a computing device within the same computer network as the BCRA computing device. In another example, the certificate authority computing device is a remote computing device. More specifically, this will mean that the certificate authority computing device does not belong to the same computer network as the BCRA computing device, and/or it is associated with a certificate authority that is not affiliated with the organization that operates the BCRA computing device. In yet another example, the BCRA computing device is also a certificate authority computing device. In this particular example, the BCRA computing device does not send certificate signing requests to an external computer and instead issues these certificate signing requests to itself and then issues digital certificates for use by the requestor. In a related example, the BCRA computing device does not generate a certificate signing request and simply issues the digital certificate once biometric authentication has been completed.

The BCRA computing device is configured to transmit 406, to the requestor computing device. The first biometric sample request message prompts the requestor to provide a first biometric sample. More specifically, the first biometric sample request message prompts a computer application on the requestor computing device to activate and display the first biometric sample request message. In another example, the requestor is prompted via an electronic message (e.g., an email) to provide the first biometric sample via a website or other electronic means. Accordingly, the requestor provides the first biometric sample through the prescribed means to the BCRA computing device.

The BCRA computing device is configured to authenticate 408 the first biometric sample received from the requestor computing device. The BCRA computing device performs the authentication by, for example, determining a match between the first biometric sample and a stored biometric sample for the requestor. As noted earlier, the requestor will have provided, during a registration process, a reference biometric sample for storage by the BCRA computing device. If a match is found, the BCRA computing device deems the requestor to be authenticated and proceeds to generate a certificate signing request.

The BCRA computing device is configured to, based on the authentication, initiate 410 providing the certificate file to the requestor computing device. More specifically, the BCRA computing device generates a certificate signing request for submission to a certificate authority computing device. The certificate signing request is configured to request a certificate of the certificate service type previously specified by the requestor in the service selection request message. Additionally, the certificate signing request will be in a format that corresponds to the certificate authority. The BCRA computing device determines the format by, for example, performing a lookup in the memory device for a format or formats that correspond to the earlier-identified certificate authority computing device.

The BCRA computing device transmits the certificate signing request to the certificate authority computing device and is configured to receive, from the certificate authority computing device, a certificate file. The certificate file includes the certificate that corresponds to the certificate service type specified by the requestor. The BCRA computing device is configured to transmit the certificate file to the requestor computing device. More specifically, the BCRA computing device determines the optimal transmission method for the requestor which includes, for example, storing the certificate at an electronic endpoint (e.g., a web page) and generating a universal resource locator (URL) that points to that electronic endpoint. In this example, the BCRA computing device transmits the URL to the requestor computing device, and informs the requestor that the certificate is available. The requestor downloads the certificate and uses it for the service that the requestor previously specified.

Figure 5:
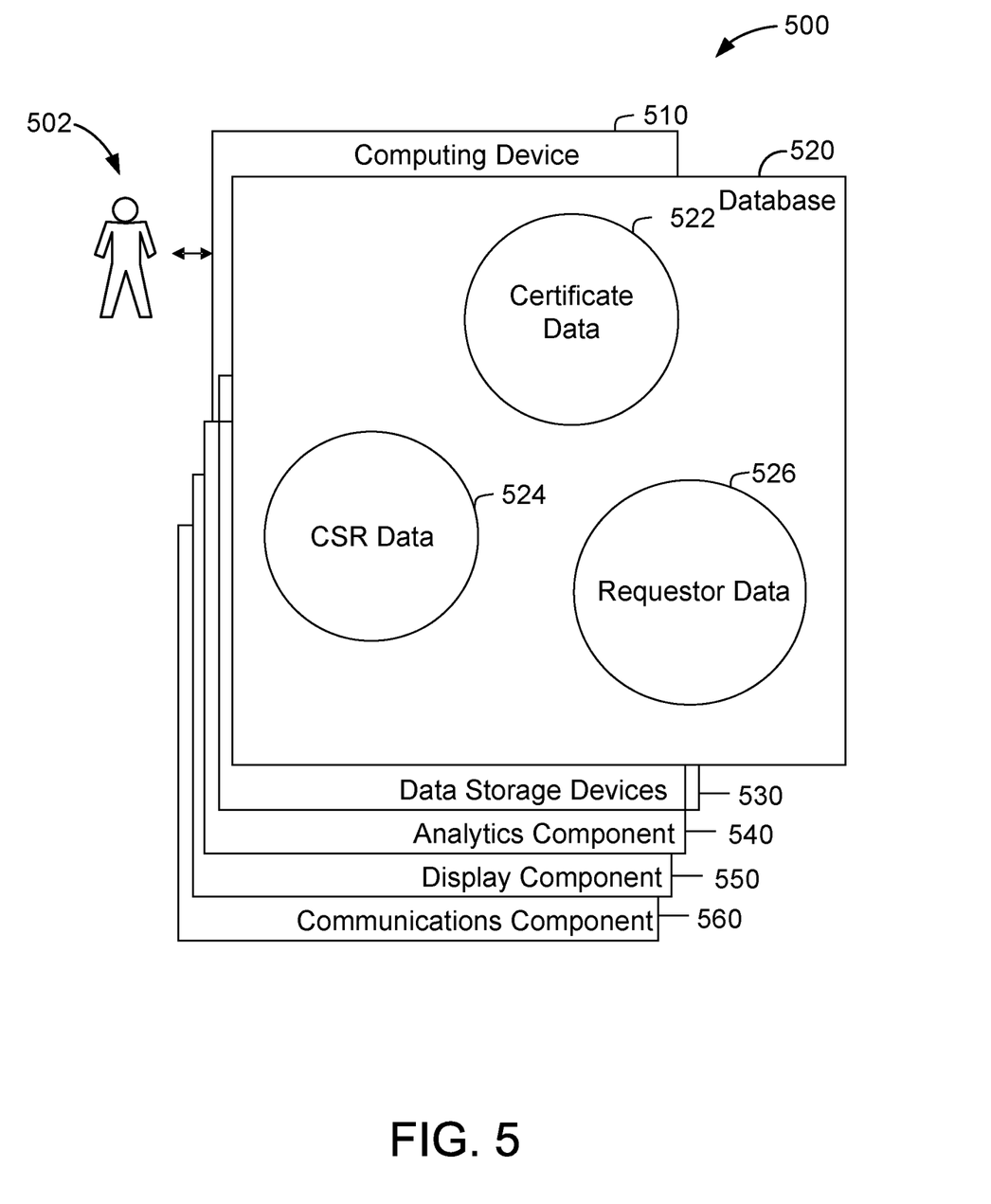
FIG. 5 shows an example configuration of a database within a computer device, along with other related computer components, that may be used to enable a requestor to biometrically authenticate during a certificate signing request process.

FIG. 5 shows an example configuration of a database 500 within a computer device, along with other related computer components, that may be used to enable a requestor to biometrically authenticate during a certificate signing request process. In some embodiments, computer device 510 is similar to BCRA computing device 101 (shown in FIG. 1). Operator 502 (such as a user operating BCRA computing device 101) may access computer device 510 in order to manage biometric authentication for one or more other users (such as the requestors that request digital certificates). In some embodiments, database 520 is similar to storage device 134 (shown in FIG. 1). In the example embodiment, database 520 includes certificate data 522, certificate signing request data 524, and requestor data 526. Certificate data 522 includes data relating to digital certificates that are requested by requestors and issued by certificate authorities. Certificate data 522 may be used to store previously issued digital certificates and associated metadata such as expiration dates and associated requestors. Certificate signing request data 524 includes data regarding content and format of certificate signing requests. These include certificate identifiers, requestor identifiers, service selection identifiers, certificate signing request metadata (dates/times), or the like. Requestor data 526 includes data relating to requestors that have registered to use the BCRA computing device. These include requestors' stored biometric samples, requestor application identifiers, requestor identifiers, requestor computing device data, and data linkages connecting these data.

Computer device 510 also includes data storage devices 530. Computer device 510 also includes analytics component 540 that assists in determining, for example, matches between stored biometric samples and candidate biometric samples provided by requestors. Computer device 510 also includes display component 550 that can be used by user 502 to view the status of BCRA computing device 101. Computer device 510 also includes communications component 560 which is used to communicate with remote computer devices (e.g., a requestor computing device). In one embodiment, communications component 560 is similar to communications interface driver 115 (shown in FIG. 1).

As will be appreciated based on the foregoing specification, the above-described embodiments of the disclosure may be implemented using computer programming or engineering techniques including computer software, firmware, hardware or any combination or subset thereof, wherein the technical effect is to establish and operate a file system-based application network. Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A biometric certification request authentication (BCRA) computing device for authenticating a requestor undergoing a certificate signing request process, the BCRA computing device comprising:
  at least one computer hardware processor in communication with a memory device;
  the BCRA computing device configured to:
    receive, from a requestor computing device, a service selection request message that identifies a certificate service type for which the requestor requires a certificate;
    identify a certificate authority computing device that corresponds to a certificate authority that generates certificates of the certificate service type;
    determine that an approval policy associated with the certificate service type requires authentication validation for the requestor and a supervisor of the requestor;
    transmit i) a first biometric sample request message to the requestor computing device, wherein the first biometric sample request message prompts the requestor to provide a first biometric sample, and ii) a second biometric sample request message to a supervisor computing device associated with the supervisor, wherein the second biometric sample request message prompts the supervisor to provide a second biometric sample;
    authenticate i) the first biometric sample received from the requestor computing device by determining a match between the first biometric sample and a stored biometric sample for the requestor, and ii) the second biometric sample received from the supervisor computing device by determining a match between the second biometric sample and a stored biometric sample for the supervisor; and
    based on the authentication, initiate providing a certificate file to the requestor computing device.

2. The BCRA computing device of claim 1, wherein transmitting the second biometric sample request message further comprises transmitting the second biometric sample request message in response to authenticating the first biometric sample.

3. The BCRA computing device of claim 1 further configured to store, in the memory device, i) a first authentication validation record for the requestor in association with the service selection request message, and ii) a second authentication validation record for the supervisor in association with the service selection request message, wherein the second authentication validation record is chained to the first authentication validation record.

4. The BCRA computing device of claim 3 further configured to:
  based on an identified certificate authority, determine the approval policy associated with the certificate authority, wherein the approval policy requires a predetermined number of approvals before a certificate signing request is approvable;
  generate an approval chain record using at least the first authentication validation record and the second authentication validation record;
  determine that the approval chain record is at least equal to the predetermined number of approvals required by the approval policy; and
  generate the certificate signing request based on the determination.

5. The BCRA computing device of claim 1 further configured to:
  based on the authentication, generate a certificate signing request, wherein the certificate signing request is in a format that corresponds to the certificate authority;
  receive, from the certificate authority computing device, the certificate file that includes the certificate that corresponds to the certificate service type; and
  transmit the certificate file to the requestor computing device.

6. The BCRA computing device of claim 1 further configured to authenticate the first biometric sample received from the requestor computing device by:
  transmitting the first biometric sample to a third party biometric authentication service; and
  receiving an authentication confirmation from the third party biometric authentication service.

7. A method for authenticating a requestor undergoing a certificate signing request process, the method implemented using a biometric certification request authentication (BCRA) computing device, the BCRA computing device comprising at least one computer hardware processor in communication with to a memory device, the method comprising:

receiving, from a requestor computing device, a service selection request message that identifies a certificate service type for which the requestor requires a certificate;

identifying a certificate authority computing device that corresponds to a certificate authority that generates certificates of the certificate service type;

determining that an approval policy associated with the certificate service type requires authentication validation for the requestor and a supervisor of the requestor;

transmitting i) a first biometric sample request message to the requestor computing device, wherein the first biometric sample request message prompts the requestor to provide a first biometric sample, and ii) a second biometric sample request message to a supervisor computing device associated with the supervisor, wherein the second biometric sample request message prompts the supervisor to provide a second biometric sample;

authenticating i) the first biometric sample received from the requestor computing device by determining a match between the first biometric sample and a stored biometric sample for the requestor, and ii) the second biometric sample received from the supervisor computing device by determining a match between the second biometric sample and a stored biometric sample for the supervisor; and based on the authentication, initiating providing a certificate file to the requestor computing device.

8. The method of claim 7, wherein transmitting the second biometric sample request message further comprises transmitting the second biometric sample request message in response to authenticating the first biometric sample.

9. The method of claim 7 further comprising storing, in the memory device, i) a first authentication validation record for the requestor in association with the service selection request message, and ii) a second authentication validation record for the supervisor in association with the service selection request message, wherein the second authentication validation record is chained to the first authentication validation record.

10. The method of claim 9 further comprising:

based on an identified certificate authority, determining the approval policy associated with the certificate authority, wherein the approval policy requires a predetermined number of approvals before a certificate signing request is approvable;

generating an approval chain record using at least the first authentication validation record and the second authentication validation record;

determining that the approval chain record is at least equal to the predetermined number of approvals required by the approval policy; and generating the certificate signing request based on the determination.

11. The method of claim 7 further comprising:

based on the authentication, generating a certificate signing request, wherein the certificate signing request is in a format that corresponds to the certificate authority;

receiving, from the certificate authority computing device, the certificate file that includes the certificate that corresponds to the certificate service type; and transmitting the certificate file to the requestor computing device.

12. The method of claim 7 further, wherein authenticating the first biometric sample received from the requestor computing device further comprises:

transmitting the first biometric sample to a third party biometric authentication service; and receiving an authentication confirmation from the third party biometric authentication service.

13. A non-transitory computer readable medium that includes computer-executable instructions for authenticating a requestor undergoing a certificate signing request process, wherein when executed by a biometric certification request authentication (BCRA) computing device including at least one computer hardware processor and coupled to a memory device, the computer-executable instructions cause the BCRA computing device to:

receive, from a requestor computing device, a service selection request message that identifies a certificate service type for which the requestor requires a certificate;

identify a certificate authority computing device that corresponds to a certificate authority that generates certificates of the certificate service type;

determine that an approval policy associated with the certificate service type requires authentication validation for the requestor and a supervisor of the requestor;

transmit i) a first biometric sample request message to the requestor computing device, wherein the first biometric sample request message prompts the requestor to provide a first biometric sample, and ii) a second biometric sample request message to a supervisor computing device associated with the supervisor, wherein the second biometric sample request message prompts the supervisor to provide a second biometric sample;

authenticate i) the first biometric sample received from the requestor computing device by determining a match between the first biometric sample and a stored biometric sample for the requestor, and ii) the second biometric sample received from the supervisor computing device by determining a match between the second biometric sample and a stored biometric sample for the supervisor; and based on the authentication, initiate providing a certificate file to the requestor computing device.

14. The non-transitory computer readable medium of claim 13, wherein transmitting the second biometric sample request message further comprises transmitting the second biometric sample request message in response to authenticating the first biometric sample.

15. The non-transitory computer readable medium of claim 13, wherein the computer-executable instructions further cause the BCRA computing device to store, in the memory device, i) a first authentication validation record for the requestor in association with the service selection request message, and ii) a second authentication validation record for the supervisor in association with the service selection request message, wherein the second authentication validation record is chained to the first authentication validation record.

16. The non-transitory computer readable medium of claim 15, wherein the computer-executable instructions further cause the BCRA computing device to:

based on an identified certificate authority, determine the approval policy associated with the certificate authority, wherein the approval policy requires a predetermined number of approvals before a certificate signing request is approvable;

generate an approval chain record using at least the first authentication validation record and the second authentication validation record;

determine that the approval chain record is at least equal to the predetermined number of approvals required by the approval policy; and generate the certificate signing request based on the determination.

17. The non-transitory computer readable medium of claim 13, wherein the computer-executable instructions further cause the BCRA computing device to:

based on the authentication, generate a certificate signing request, wherein the certificate signing request is in a format that corresponds to the certificate authority;

receive, from the certificate authority computing device, the certificate file that includes the certificate that corresponds to the certificate service type; and transmit the certificate file to the requestor computing device.

* * * * *